United States Patent [19]

Borciani et al.

[11] 3,719,890

[45] March 6, 1973

[54] TRANSCEIVER FOR PERIPHERAL STATION OF MULTIPLEX TELECOMMUNICATION SYSTEM

[75] Inventors: Franco Borciani; Gaetano Musarra, both of Milan, Italy

[73] Assignee: Societa Italiana Telecomunicazioni Siemens S.p.A., Milano, Italy

[22] Filed: Nov. 22, 1971

[21] Appl. No.: 200,802

[30] Foreign Application Priority Data

Nov. 20, 1970 Italy..............................31976 A/70

[52] U.S. Cl.......................325/55, 325/38 R, 325/53, 325/64, 179/2 DP, 340/152, 340/167, 340/172.5

[51] Int. Cl.................................................H04b 1/00

[58] Field of Search.........................325/38 R, 51–55, 325/58, 64, 66; 179/15 BY, 2 DP; 340/152 R, 154, 167, 172.5

[56] References Cited

UNITED STATES PATENTS 3,594,727 7/1971 Braun..............................340/152 R

*Primary Examiner*—Albert J. Mayer
*Attorney*—Karl F. Ross

[57] ABSTRACT

A peripheral station of a pulse-code-modulation telemetring system, identified by an address code, has a logic matrix responding to the arrival of an incoming message from an associated central station by commanding a clock circuit to generate a series of pulses for controlling the inscription of the message words in a shift register and the readout thereof to an address comparator and to an output memory. The address comparator, upon ascertaining identity between the station's code and the first part of the stored message, enables the memory to transmit the remainder of the message to a processor which initiates the transmission of an outgoing message to the central office by triggering the logic matrix to call forth another pulse sequence from the clock circuit. The logic matrix comprises a set of AND and OR gates serving to set and reset several flip-flops which mark a quiescent condition, a transitory condition, a transmitting condition or a receiving condition.

10 Claims, 4 Drawing Figures

FRANCO BORCIANI
GAETANO MUSARRA
INVENTORS.

BY

Karl F. Ross
Attorney

FRANCO BORCIANI
GAETANO MUSARRA
INVENTORS.

BY

Karl F. Ross
Attorney

FRANCO BORCIANI
GAETANO MUSARRA
INVENTORS.

BY Karl F. Ross
Attorney

TRANSCEIVER FOR PERIPHERAL STATION OF MULTIPLEX TELECOMMUNICATION SYSTEM

Our present invention relates to a multiplex telecommunication system, e.g. for telemetering purposes, of the type using pulse-code modulation for two-way communication between a central station and a plurality of peripheral stations each identified by an individual address code. More particularly, the invention relates to a transceiver for such peripheral station designed to facilitate the exchange of code messages between the central station and a processor in a selected peripheral station, i.e. for passing incoming messages prefaced by the corresponding address code from the two-way PCM channel to the processor over a receiving circuit and for passing encoded information from the processor via a transmitting circuit to the PCM channel for delivery to the central station as an outgoing message.

The general object of our invention is to provide simple logical circuitry in such a transceiver for the reception and transmission of these code messages in different operating phases, with utilization of certain components common to both the transmitting and the receiving circuit.

A more particular object is to provide a transceiver in which the two circuits include common storing means, such as a shift register, for the words of both incoming and outgoing messages so as to minimize the overall number of register stages required.

In accordance with the present invention, the receiving and transmitting circuits of our improved transceiver have not only the word register in common but also a timer or clock circuit generating a train of word-counting pulses to control, during transmission, the operation of an input stage passing the encoded information from the processor to the register and, during reception, the operation of a discriminator comparing the address part of an incoming message with the address code assigned to the peripheral station considered. If the two address codes match, the discriminator enables an output stage of the receiving circuit to pass the remainder of the incoming message to the processor, e.g. after intermediate storage in a memory forming part of that stage.

With the use of a shift register for the temporary storage of each incoming or outgoing word, the bits constituting such word may be fed in serially from the PCM channel to load the register during reception and may be read out in parallel to the address comparator of the discriminator stage and to the associate output memory; during transmission, this shift register may be loaded in parallel with the encoded information from the processor and may be read out in series to the PCM channel. The stepping of the shift register for the serial loading and readout occurs in response to clock pulses from the timer having the cadence of the individual bits, i.e. a multiple of that of the word-counting pulses.

In many instances, the incoming code words stored in binary form in the common register are to be delivered in a higher-order code, e.g. in decadic form, to the address comparator and to the processor. In such a case the register works into a decoder performing the necessary conversion.

In the event that a reception command, derived from the leading edge of an incoming code message, coincides with a transmission command, generated by the processor in response to prior instructions from the central station or to the occurrence of an event to be reported thereto, the transmission command overrides the reception command so that the system switches to its transmitting rather than to its receiving condition. At the end of an interval allocated to the transmission or the reception of a message, the system returns to a quiescent condition in which the register is cleared and all components are reset to zero.

Advantageously, both the output stage of the register (i.e. the decoder) and a transfer stage in the register input are normally inhibited and are periodically activated by an enabling signal in the rhythm of the word-counting pulses, specifically by a reading pulse signal delivered from the timer to the decoder in the receiving condition and by writing pulse delivered by the timer to the transfer stage in the transmitting condition. These enabling signals, whose duration substantially equals the width of a clock pulse, prevent the modification of the contents of the register during readout.

According to an important feature of our invention, the operation of the above-described components is controlled by a logic matrix correlating the reception and transmission commands, the stepping and readout pulses for the register, the bits of the incoming messages, the acknowledgment signals emitted by the timer in response to trigger pulses initiating reception or transmission, and a continuity signal, generated by the decoder in response to a synchronizing code at the start of an incoming message, with certain signals establishing or indicating the several states of the system, i.e. the quiescent, receiving and transmitting conditions referred to above. These states advantageously also include a transitory or metastable condition which is reached when the logic matrix, in the quiescent condition, receives either a reception command or a transmission command; if these components terminate prematurely, i.e. before the timer has had an opportunity to emit the appropriate acknowledgment signal measuring a receiving or transmitting period of predetermined duration, the system reverts to its quiescent state.

The above and other features of our invention will be described in detail hereinafter with reference to the accompanying drawing in which.

Figure 1:
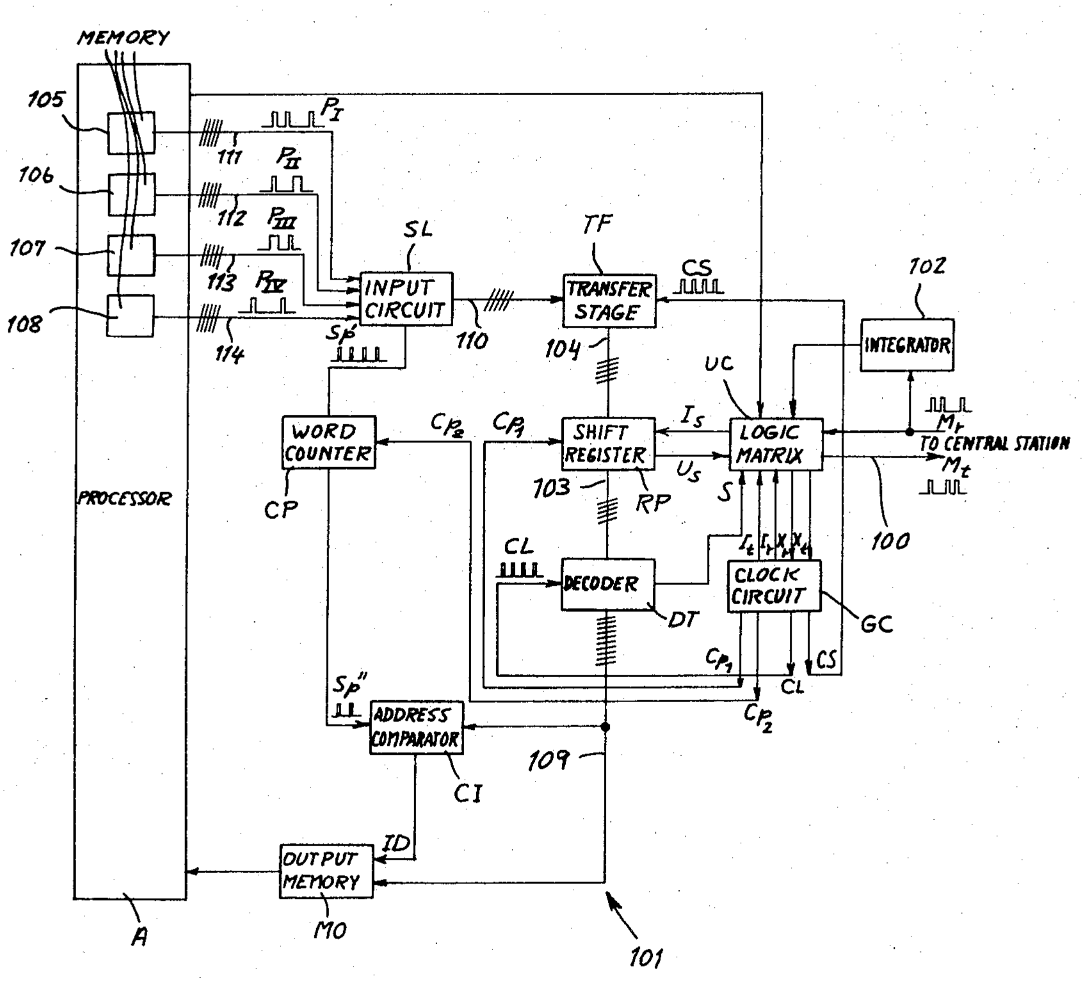
FIG. 1 is a block diagram illustrating the basic components of our improved transceiver.

In FIG. 1 we have shown a peripheral station of a telecommunication system in which several such stations, not further illustrated, are connected to a common central station via a two-way PCM transmission channel 100. The station shown in FIG. 1 comprises a transceiver 101, connected across line 100, serving to convey instructions from the central station to a processor A and to extract information from that processor for forwarding to the central station.

Transceiver 101 comprises a logic matrix UC directly receiving incoming messages, i.e. series of bits $M_r$, and sending out similar sequences of bits $M_t$ constituting outgoing messages. An integrator 102 derives from the incoming messages a reception command R whose arrival at the matrix UC initiates the establishment of a receiving condition unless it is overridden by a concurrently present transmission command T originating at processor A.

Logic matrix UC co-operates with a clock circuit or timer GC receiving from it one of two trigger signals $X_r$, $X_t$ in response to command R or T, respectively. These signals call forth a respective acknowledgment signal $I_r$ or $I_t$ measuring the duration of a reception or transmission period initiated thereby. Timer GC also generates a train of clock pulses $Cp_1$ and a train of word-counting pulses $Cp_2$ of the same width but of a cadence equaling an aliquot fraction of the clock-pulse cadence. The clock pulses $Cp_1$ occur in the rhythm of message bits $M_r$ and $M_t$ whereas the word-counting pulses $Cp_2$ mark the end of each word composed of a predetermined number (here 5) of such bits.

Two further signals generated by clock signal GC are a set of a reading pulses CL and a set of writing pulses CS. Reading pulses CL are fed to a decoder DT, here assumed to be a conventional binary/decimal converter, which is connected by a set of five parallel leads 103 (as diagrammatically illustrated by five transverse strokes) to the several stage outputs of a five-stage shift register RP receiving stepping pulses $I_s$ from matrix UC and delivering readout pulses $U_s$ thereto. Writing pulses CS are supplied to a transfer station TF connected via another five-lead multiple 104 to the several stage inputs of register RP.

Transfer stage TF is included in a transmission circuit extending from the processor A to the communication channel 100 by way of register RP and logic matrix UC, this circuit comprising an input stage SL constituted by a set of gates selectively connecting the transfer stage TF to a plurality of five-stage memories 105, 106, 107, 108 of the processor in a predetermined order of succession. These processor memories store, in the form of five-bit binary code words $P_1$, $P_{11}$, $P_{111}$, $P_{IV}$, the information collected by the processor (e.g. the setting of one or more instruments) to be communicated to the central station. The bits of these four binary words are applied in parallel to the selector SL over respective five-lead multiples 111, 112, 113, 114 for retransmission to transfer stage TF by way of a similar multiple 110.

A word counter CP, stepped by the pulses $Cp_2$ from timer GC, delivers similar stepping pulses Sp′ to selector SL for successively switching it onto the multiples 111-114 during the last four cycles of a five-cycle transmission period. Counter CP also delivers a pair of such stepping pulses Sp″, during the second and third cycles of a five-cycle reception period, to an address comparator CI discriminating between incoming messages destined for its own station and those intended for other peripheral stations. Address comparator CI has an input connected to a ten-lead output multiple 109 of decoder DT to receive the decadic equivalent of the binary words successively stored in register RP during reception, i.e. in the presence of reading pulses CL activating the decoder DT. Comparator CI, upon ascertaining a match between the address of its own station and the output of decoder DT in the second and third reception cycles, emits an identity signal ID to an output stage of the reception circuit in the form of a memory MU which is thereby enabled to store the decoder output in the last two cycles of that period and to pass on the corresponding instructions to the processor A.

A further output lead of decoder DT carries, during reception, a continuity signal S which it generates in response to a synchronizing code received as the first word of an incoming message. Signal S continues to the end of the reception period, i.e. until the decoder is deactivated by the prolonged absence of reading pulses CL.

With the exception of logic matrix UC, whose construction will be described in detail hereinafter with reference to FIG. 3, all the components shown in FIG. 1 may be of conventional design.

Figures 2, 3:
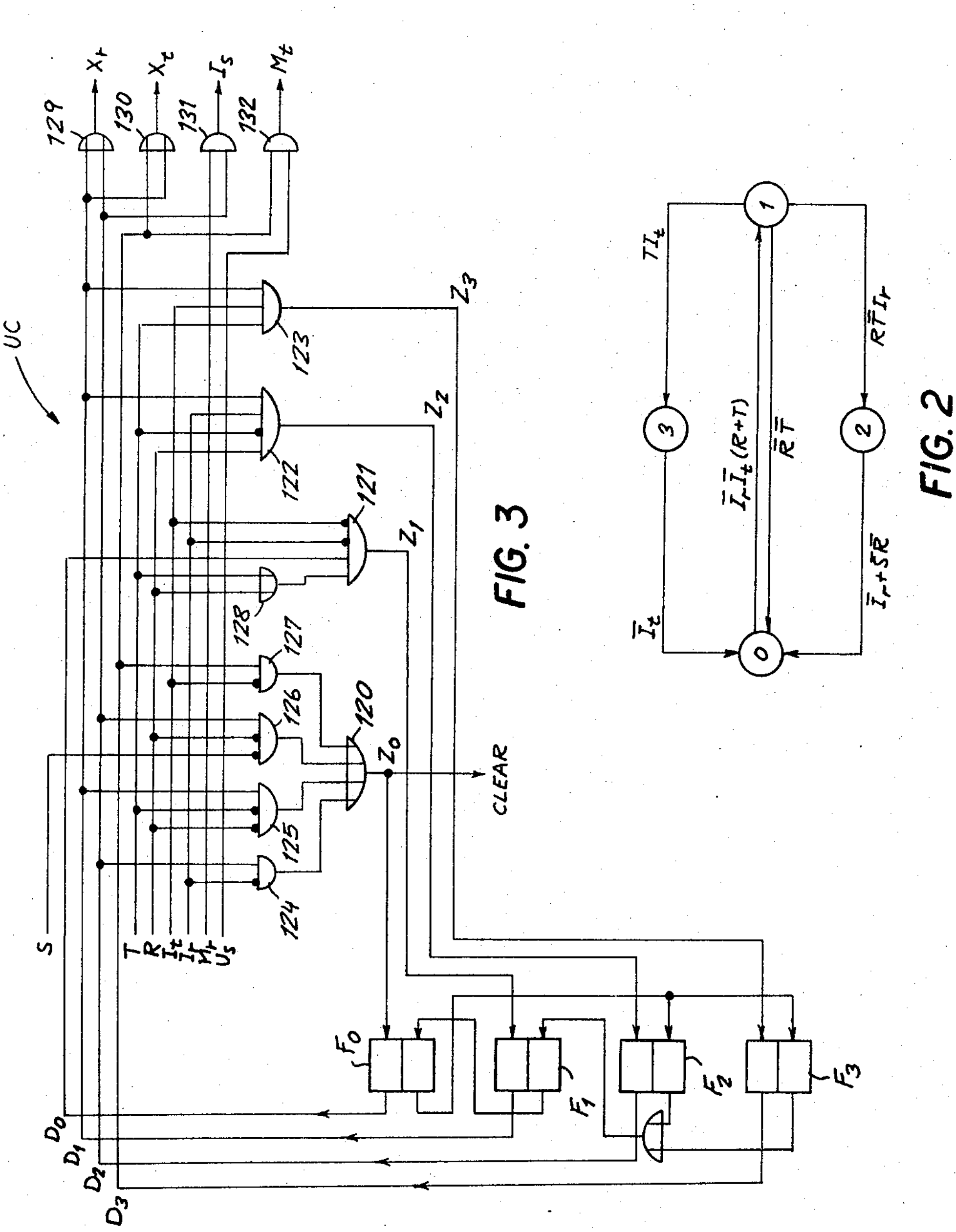
FIG. 2 is a flow diagram serving to explain the sequence of operations of the transceiver of FIG. 1.
FIG. 3 is a circuit diagram of a logic matrix included in the system of FIG. 1.

Reference will now be made to FIG. 2 for a description of the several states which the system of FIG. 1 assumes during operation.

The normal state, i.e. a quiescent condition 0, prevails when no messages are either received or transmitted. In this condition the register RP is cleared, selector SL communicates with none of the leads 111–114, counter CP is reset and transfer stage TF is blocked; no pulses are then emitted by timer GC.

Upon the generation of a reception or transmission command R or T, and with acknowledgement signals $I_r$ and $I_t$ absent to indicate the idle state, the system advances to a transitory condition 1 which is a metastable state designed to avoid operation in response to spurious signals or transients. If this state has been brought about by a genuine reception command R, and if there is no interference by a simultaneous transmission command T, the arrival of the corresponding acknowledgement signal $I_r$ from clock circuit GC switches the system to state 2 representing the receiving condition. If, as is normally the case, the reception command R continues beyond the generation of the first reading pulses CL by the timer, the occurrence of the continuity signal S maintains this condition until the signal $I_r$ ceases. If, however, message transmission at the central station is prematurely terminated within the first cycle, the system immediately returns to the quiescent condition 0.

If the shift to transitory condition 1 was due to a transmission command T, the arrival of the corresponding acknowledgement signal $I_t$ from the clock circuit advances the system to state 3 which is the transmitting condition. This condition persists invariably until, after five cycles, the timer signal $I_t$ disappears, thereby restoring the quiescent condition 0.

FIG. 3 shows the logic of matrix UC designed to carry out the sequence of operations just described. The appearance of an idleness signal $Z_0$ in the output of an OR gate 120 establishes the quiescent condition 0 by setting a flip-flop $F_0$ which thereby generates a normal output signal $D_0$. Condition 1 is established by a first activity signal $A_1$ in the output of an AND gate 121 and results in the setting of a flip-flop $F_1$ to generate a first off-normal output signal $D_1$. Another AND gate 122 produces a second activity signal $Z_2$ to bring about condition 2 by setting a flip-flop $F_2$ and producing a second off-normal output signal $D_2$. Similarly, a further AND gate 123 conducts in condition 3 to emit a third activity signal $Z_3$, thereby setting a flip-flop $F_3$ and generating a third off-normal output signal $D_3$. The setting of any of these flip-flops resets the flip-flop previously set.

OR gate 120 has four inputs emanating from respective AND gates 124, 125, 126, 127. Gate 124 has an inverting input and a noninverting input respectively receiving the signals $I_r$ and $D_2$. Gate 125 has a noninverting input energizable by signal $D_1$ and two inverting inputs carrying signals T and R. Gate 126 has a noninverting input connected to receive the signal $D_2$ and two inverting inputs respectively supplied with signals S and R. Gate 127 has an inverting input energizable by signal $I_t$ and a noninverting input receiving the signal $D_3$. This logic, therefore, corresponds to the equation:

$$Z_0=\overline{R}\,\overline{T}D_1+(\overline{S}\,\overline{R}+\overline{I_R})D_2+\overline{I_t}D_3 \qquad (1)$$

AND gate 121 has a first noninverting input connected through an OR gate 128 to lines carrying signals T and R, a second noninverting input receiving the signal $D_0$, and two inverting inputs energizable by signals $I_r$ and $I_t$, respectively. This logic can be expressed as follows:

$$Z_1=\overline{I_r}\,\overline{I_t}(R+T)D_0 \qquad (2)$$

AND gate 122 has an inverting input carrying signal T and three noninverting inputs respectively receiving the signals $I_r$, R and $D_1$. Thus, we have the formula:

$$Z_2=R\overline{T}I_rD_1 \qquad (3)$$

AND gate 123 has three noninverting inputs respectively receiving the signals $D_1$, T and $I_t$. This yields the expression:

$$Z_3=TI_tD_1 \qquad (4)$$

A further OR gate 129 receives at its two inputs the signals $D_1$ and $D_2$ to generate the trigger signal $X_r$, wherefore we can write:

$$X_r\ D_1+D_2 \qquad (5)$$

In an analogous manner, a further OR gate 130 has two inputs carrying signals $D_1$ and $D_3$ to generate the trigger signal $X_t$ according to the equation:

$$X_t=D_1+D_3 \qquad (6)$$

An OR gate 131, receiving at its inputs the incoming bits $M_r$ and the signal $D_2$, generates the stepping pulses $I_s$ serially fed to the decoder DT; thus:

$$I_s=M_rD_2 \qquad (7)$$

Finally, an AND gate 132 has its two inputs energizable by signal $D_3$ and the serially generated readout pulses $U_s$ to provide the outgoing bits $M_t$ in conformity with the relationship:

$$M_t=U_sD_3 \qquad (8)$$

Figure 4:
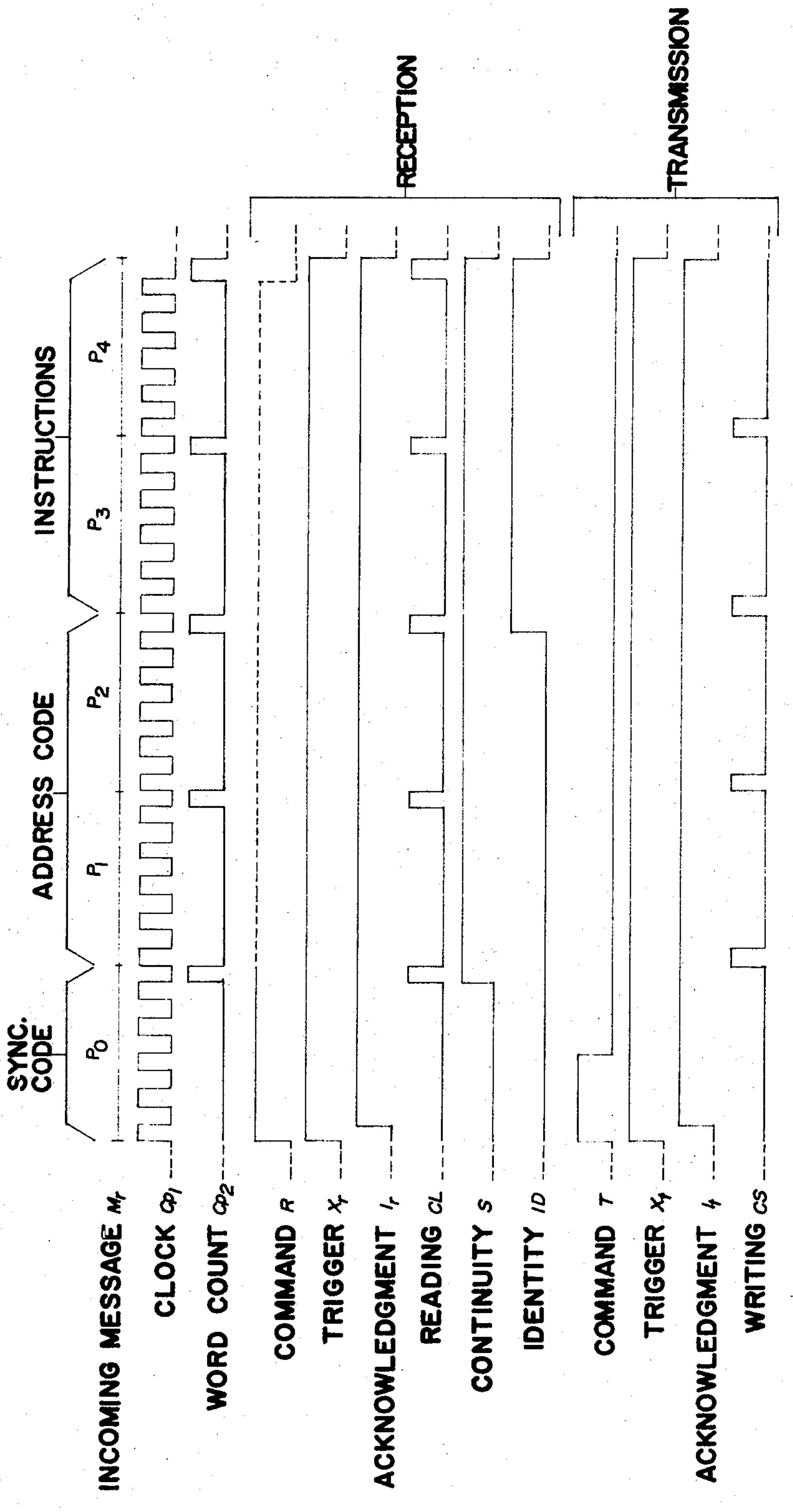
FIG. 4 is a set of graphs showing the signals and pulses received by or generated within the system.

In FIG. 4 we have illustrated the bits $M_r$ of an incoming message, divided into five words $P_0$, $P_1$, $P_2$, $P_3$, $P_4$, together with timer pulses $Cp_1$ and $Cp_2$, command signals R and T, trigger signals $X_r$ and $X_t$, acknowledgement signals $I_r$ and $I_t$, reading and writing pulses CL and CS, continuity signal S and identity signal ID. It will be noted that each word spans five clock pulses $Cp_1$, coinciding with five bits, and is immediately followed by a counting pulse $Cp_2$. Reception command R comes into existence upon the arrival of the first bit $M_r$ which forms part of a synchronizing code constituted by the word $P_0$. This synchronizing code may consist entirely of finite bits (of binary value "1") to be integrated in circuit 102 of FIG. 1; depending upon the character of subsequent bits, signal R may or may not persist or recur for the remainder of the reception period.

Command R gives rise to trigger signal $X_r$ which immediately starts the timer to generate the clock pulse $Cp_1$ coinciding with the successive bit positions of the incoming message; the first clock pulse, though illustrated in FIG. 4, need not actually come into existence. The timer then emits the acknowledgement signal $I_r$ and, after the last bit of word $P_0$, a counting pulse $Cp_2$. The arrival of this pulse at word counter CP (FIG. 1) produces stepping pulses Sp′ and Sp″, only the latter being significant during the reception period now considered. Discriminator CI is enabled to compare the address of the station with the code represented by the next two words $P_1$ and $P_2$ as translated by the decoder DT, immediately after the initiation of continuity signal S, into a decimal code marked by the energization of one of its ten output leads 109 during each of these cycles. Discriminator CI, upon recognizing the address as that of its station, emits the identity signal ID at the end of word $P_2$ whereupon words $P_3$ and $P_4$ are registered in memory MU preparatorily to being forwarded to processor A.

When the processor is ready to send out its encoded information, it generates the transmission command T giving rise to the trigger signal $X_t$ which in turn elicits the acknowledgement signal $I_t$ from the timer. Clock and counting pulses $Cp_1$ and $Cp_2$ are again generated, as are the writing pulses CS coinciding with pulses $Cp_2$. The first four counting pulses produce as many stepping pulses Sp′ in the input of selector SL which thereupon successively connects transfer stage TF to memories 105–108 for the transmission of words $P_I = P_{IV}$ as part of an outgoing message, i.e. during the four cycles following the one in which the command T was generated.

Naturally, the number of bits per word or of words per message may be varied; also, the decoder DT may convert into a code other than the decimal one or, if desired, may preserve the binary character of the incoming words while merely generating the continuity signal $S_1$.

The code pulses arriving and departing over channel 100 may be transmitted with the aid of barrier frequencies or directly by modulation of a d-c voltage. The term "pulse-code modulation", as used hereinabove and in the appended claims, is therefore not limited to carrier-wave transmission.

We claim:

1. A transceiver for a peripheral station of a pulse-code-modulation telecommunication system having a central station and a plurality of peripheral stations each identified by an individual address code, each peripheral station being linked with the central station by a two-way communication channel and being provided with a processor for performing instructions contained in an incoming message prefaced by the corresponding address code and for encoding information to be sent to the central station in outgoing messages, said transceiver comprising:

a receiving circuit for incoming messages between said channel and said processor;

a transmitting circuit for outgoing messages between said channel and said processor;

register means common to said receiving and transmitting circuits for temporarily storing a code word forming part of a message passing over either of said circuits;

discriminator means in said receiving circuit for comparing the address code of an incoming message, read out from said register means, with an assigned address code and for generating an identity signal upon ascertainment of a match therebetween;

output means in said receiving circuit responsive to said identity signal for passing the remainder of an incoming message from said register means to said processor;

timing means for generating a train of word-counting pulses and for controlling the operation of said register means;

input means in said transmitting circuit for controlling the passage of encoded information from said processor to said register means;

counter means responsive to said word-counting pulses for selectively activating said discriminator means to receive the address code of an incoming message from said register means and activating said input means to transmit a predetermined number of code words from said processor to said register means as part of an outgoing message; and control means responsive to a reception command from said channel and to a transmission command from said processor for activating said timing means to emit said word-counting pulses and to condition said register means for the storage of successive code words.

2. A transceiver as defined in claim 1 wherein said register means comprises a binary shift register with serial loading from and readout to said channel and with parallel loading from said input means and readout to said discriminator means and output means, said timing means generating a train of clock pulses at a cadence equal to a multiple of that of said word-counting pulses for controlling the serial loading and readout of said shift register.

3. A transceiver as defined in claim 2 wherein said register means further comprises a decoder for converting binary code words stored therein into a higher-order code on transmission to said discriminator means and said output means.

4. A transceiver as defined in claim 3 wherein said transmitting circuit includes a transfer stage interposed between said input means and said register means, said timing means being provided with output connections to said decoder and to said transfer stage for activating same in the rhythm of said word-counting pulses for periods on the order of the width of a clock pulse.

5. A transceiver as defined in claim 4 wherein said processor includes sources of several code words to be incorporated into an outgoing message, said input means comprising a selector for successively connecting said sources to said transfer stage.

6. A transceiver as defined in claim 1 wherein said output means comprises a memory for the temporary storage of said remainder of an incoming message.

7. A transceiver as defined in claim 1 wherein said control means comprises a logic matrix with pulse-storing means and gate means for normally establishing a quiescent condition, establishing a transitory condition in response to either of said commands with emission of a trigger signal for said timing means, establishing a receiving condition in response to an acknowledgment signal from said timing means upon the continuing presence of said transmission command, and re-establishing said quiescent condition upon the disappearance of said acknowledgment signal.

8. A transceiver as defined in claim 7 wherein said logic matrix is connected to switch from said transitory condition to said transmitting condition upon simultaneous presence of said commands.

9. A transceiver as defined in claim 8 wherein said register means includes an emitter of continuity signal responsive to a synchronizing code of an incoming message preceding the address code, said continuity signal persisting for the duration of said receiving condition.

10. A transceiver as defined in claim 9 wherein said logic matrix is connected to generate an idleness signal $Z_0$ in said quiescent condition, a first activity signal $Z_1$ in said transitory condition, a second activity signal $Z_2$ in said receiving condition, a third activity signal $Z_3$ in said transmitting condition, a trigger signal $X_r$ responsive to a reception command R, a trigger signal $X_t$ responsive to a transmission command T, a series of stepping pulses $I_s$ for feeding incoming bits $M_r$ to said register means, and outgoing bits $M_t$ corresponding to readout pulses $U_s$ from said register means; said pulse-storing means emitting a normal output signal $D_0$ in said quiescent condition, a first off-normal output signal $D_1$ in said transitory condition, a second off-normal output signal $D_2$ in said receiving condition and a third off-normal output signal $D_3$ in said transmitting condition; said gate means being connected to establish the following logical relationships between said signals $Z_0$, $Z_1$, $Z_2$, $Z_3$, $D_0$ , $D_1$, $D_2$, $D_3$, $X_r$, $X_t$, pulses $I_s$ and $U_s$, said bits $M_r$ and $M_t$, said commands RC and TC, said continuity signal S, and acknowledgment signals $I_r$, $I_t$ respectively emitted by said timing means in response to said trigger signals $X_r$, $X_t$ and continuing for a plurality word periods defined by said word-counting pulses:

$$Z_0 = \overline{RT}\,D_1 + (\overline{SR}+\overline{I_r})D_2+\overline{I_t}D_3$$

$$Z_1 = \overline{I_r I_t}(R+T)D_0$$

$$Z_2 = R\overline{T}\,I_r D_1$$

$$Z_3 = T I_t D_1$$

$$X_r = D_1 = D_2$$

$$X_t = D_1 = D_3$$

$$I_s = M_r D_2$$

$$M_t = U_s D_3$$

* * * * *